(12) United States Patent
Huang et al.

(10) Patent No.: US 8,813,352 B2
(45) Date of Patent: Aug. 26, 2014

(54) METHODS FOR FABRICATING A CONDUCTOR

(75) Inventors: James P. Huang, Huntington Beach, CA (US); Namsoo P. Kim, Bellevue, WA (US); Enrique V. Barrera, Houston, TX (US); Chris A. Lundberg, Kingwood, TX (US)

(73) Assignee: The Boeing Company, Chicago, IL (US)

( * ) Notice: Subject to any disclaimer, the term of this patent is extended or adjusted under 35 U.S.C. 154(b) by 779 days.

(21) Appl. No.: 12/017,904

(22) Filed: Jan. 22, 2008

(65) Prior Publication Data

US 2008/0286560 A1   Nov. 20, 2008

Related U.S. Application Data

(60) Provisional application No. 60/938,603, filed on May 17, 2007.

(51) Int. Cl.
*B29C 47/00* (2006.01)
*H01B 1/24* (2006.01)
*H01B 13/00* (2006.01)

(52) U.S. Cl.
USPC ............................. 29/825; 252/502; 428/323

(58) Field of Classification Search
CPC ...... H01B 1/24; H01B 13/00; B29C 47/0004; B29C 47/0014
USPC .............. 29/825, 829, 850; 252/502; 428/323
See application file for complete search history.

(56) References Cited

U.S. PATENT DOCUMENTS

| | | | |
|---|---|---|---|
| 6,875,374 B1 | 4/2005 | Zhan et al. | |
| 7,066,998 B2 | 6/2006 | Rohrbaugh et al. | |
| 7,094,386 B2 | 8/2006 | Resasco et al. | |
| 7,115,864 B2 | 10/2006 | Colbert et al. | |
| 7,151,129 B2 | 12/2006 | Ishikawa et al. | |
| 7,153,903 B1 | 12/2006 | Barraza et al. | |
| 7,217,374 B2 | 5/2007 | Watanabe et al. | |
| 2004/0038251 A1* | 2/2004 | Smalley et al. | 435/6 |
| 2005/0061496 A1* | 3/2005 | Matabayas, Jr. | 165/185 |
| 2005/0169830 A1* | 8/2005 | Richard et al. | 423/447.1 |
| 2008/0086876 A1* | 4/2008 | Douglas | 29/846 |
| 2010/0123274 A1* | 5/2010 | Hwang et al. | 264/435 |

OTHER PUBLICATIONS

Park, C., Wilkinson, J., Banda, S., Ounaies, Z., Wise, K. E., Sauti, G., Lillehei, P. T. and Harrison, J. S. (2006), Aligned single-wall carbon nanotube polymer composites using an electric field. Journal of Polymer Science Part B: Polymer Physics, 44: 1751-1762. doi: 10.1002/polb.20823 (first published online May 8, 2006).*

* cited by examiner

*Primary Examiner* — Livius R Cazan
(74) *Attorney, Agent, or Firm* — Armstrong Teasdale LLP

(57) ABSTRACT

A method for fabricating a conductor includes providing a plurality of conductive nano-scale material elements, dispersing the nano-scale material elements within a resin to provide a resin-nano-scale material mixture, aligning the nano-scale material elements within the resin-nano-scale material mixture, and curing the resin-nano-scale material mixture.

11 Claims, 5 Drawing Sheets

METHODS FOR FABRICATING A CONDUCTOR

CROSS REFERENCE TO RELATED APPLICATIONS

This application claims the benefit of U.S. Provisional Patent Application No. 60/938,603, filed May 17, 2007, which is hereby incorporated by reference in its entirety.

BACKGROUND OF THE INVENTION

This invention relates generally to electrical conductors, and more specifically, to highly conductive electrical wires and strips, collectively conductors, that are reduced in weight as compared to copper and aluminum wire conductor implementations that are equivalent in conductivity.

It is a continuing goal to reduce the weight of aircraft, spacecraft, and many other devices that include one or more electrical functions. In the aircraft example, any reduction in weight typically results in a corresponding reduction in fuel consumption, and may also allow for an increase in payload capacity. In other electrical devices, a reduction in weight may result in an increase in portablilty or ease of use. Finally, weight reduction in many applications will result in reduced costs.

In most existing applications, electrical power, current, and electrical/electronic signals are typically conducted through wires or cables using copper or aluminum as the conductive medium. In these applications, the amount of power, current, and signal strength are inherently limited by the electrical resistivity of the conducting materials, such as copper and aluminum, used to implement the electrical path. Finally, since copper and aluminum conductors include a resistance, current flowing therethrough will cause the wire to become a source of heat. A conductor with a lower resistance per unit area will tend to reduce the amount of heat generated within a system.

BRIEF DESCRIPTION OF THE INVENTION

In one aspect, an electrical conductor is provided that includes a plurality of nano-scale material elements and a resin matrix where the nano-scale material elements are aligned within the resin matrix.

In another aspect, a method for fabricating a conductor includes providing a plurality of conductive nano-scale material elements, dispersing the nano-scale material elements within a resin to provide a resin-nano-scale material mixture, aligning the nano-scale material elements within the resin-nano-scale material mixture, and curing the resin-nano-scale material mixture.

In still another aspect, an electrical conductor is provided that includes a plurality of nano-scale material elements each comprising a surface, at least one of a nano metal film and a plurality of nano metal particulates on the surface of the nano-scale material elements, and a resin matrix. The nano-scale material elements are aligned within the resin matrix.

In yet another aspect, a method for fabricating a conductor is provided. The method includes separating a plurality of nano-scale material elements, based on conductivity into metallic nano-scale material elements and semi-conducting nano-scale material elements, collecting the metallic nano-scale material elements at one or more electrodes, dispersing the metallic nano-scale material elements within a resin to provide a resin-nano-scale material mixture, and aligning the nano-scale material elements within the resin-nano-scale material mixture through at least one of extrusion of the resin-nano-scale material mixture and application of an electric field to the resin-nano-scale material mixture.

DETAILED DESCRIPTION OF THE INVENTION

The embodiments described herein are related to an electrical current conducting apparatus. However, the apparatus is capable of conducting the electricity while exhibiting less resistance and loss than conventional, equivalent, current carrying devices, for example, copper and aluminum wire, when compared at the same weight level. As will be appreciated after the following description, wires, strips, and other conductors fabricated from nano-scale material elements embedded into polymeric resin is different from other electrical current media currently utilized. Specifically, currently utilized media is typically based on and fabricated using metallic materials (e.g. copper or aluminum).

As a result, systems that incorporate the described electrical current carrying apparatus can be reduced in weight. In non-limiting examples, platforms such as airplane and spacecraft, systems such as radar and communication networks, electronic devices such as computer and personal hand held devices, and many electrical appliances can be reduced in weight. Further, any type of product, equipment, and apparatus, for example, printed circuit boards that incorporate the described embodiments to conduct current, for the purpose of transmitting power, current, and signal, may be reduced in weight.

Figure 1:
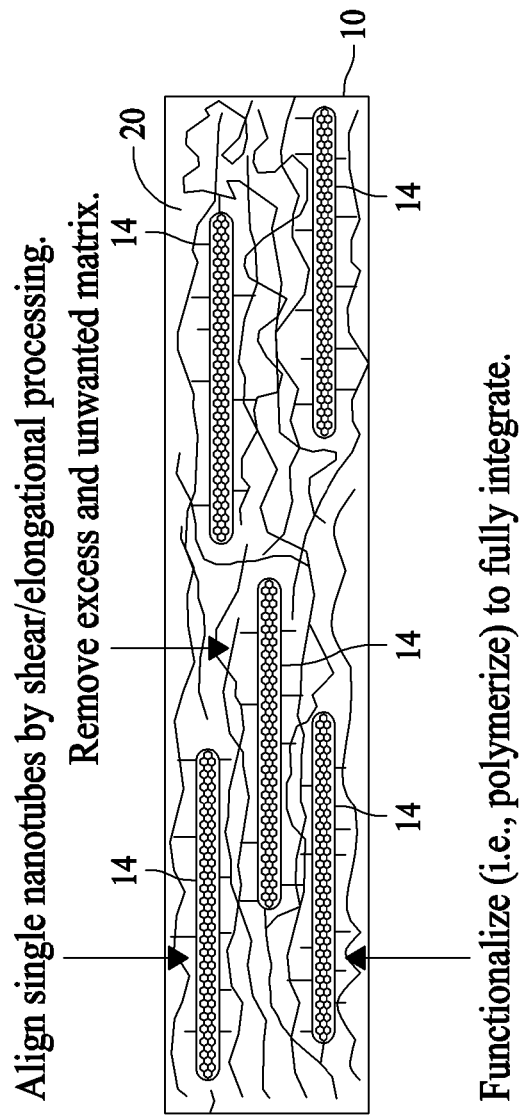
FIG. 1 is a side view of an electric conductor incorporating a plurality of nano-scale material elements embedded within a resin.

FIG. 1 is a side view of a portion of a conductor 10 that incorporates a plurality of nano-scale material elements 14 (e.g., carbon nanotube elements) embedded within a polymeric resin 20 matrix. The polymeric resin 20 is utilized to achieve an adequate structural integrity for conductor 10. As is further described herein, to fabricate the conductor 10, the nano-scale material elements 14 are aligned, for example, utilizing one or more of shear/elongational processing and an electric field. The resin 20 is then applied and any excess or unwanted resin matrix is removed from the conductor 10 before the resin 20 is cured.

More specifically, conductor 10 utilizes nano-scale material, for example, carbon nanotube elements which have shown a superb electrical conductivity. The nano-scale material elements 14 (e.g., carbon nanotubes) are embedded into a polymeric resin 20 which provides structural integrity. Since electrical conductivity is mainly achieved through utilization of the nano-scale material, it is preferable when fabricating a conductor 10 to use the smallest amount of polymeric resin 20 that is feasible while still retaining the structural integrity of the conductor 10.

As mentioned above, one example of nano-scale material includes carbon nanotube elements, which have recently become more readily available. One embodiment of a carbon nanotube has a tubular shape of a one-dimensional nature which is obtained by rolling one or more graphene sheets composed of six membered rings of carbon atoms into a tube. In general, carbon nanotube elements are constructed of a single graphene sheet is referred to as a single-wall nanotube. On the other hand, a carbon nanotube element that is fabricated from a plurality of graphene sheets is referred to as a multiple wall, or multi-wall, nanotube. A carbon nanotube constructed of two graphene sheets is then referred to as a double wall, or dual wall, nanotube. Therefore, double-wall or multi-wall carbon nanotubes have a structure resembling concentric cylinders of two or more layers. While one embodiment of a single wall nanotube element is about one nanometer in diameter, embodiments of double-wall and multi-wall carbon nanotube elements measure from about two to about 100 nanometers in diameter.

Among the various kinds of carbon nanotube elements 14 that are currently available, only the carbon nanotube elements 14 that exhibit metallic properties (e.g. having an appropriate chirality) are utilized in the fabrication of conductor 10, though other kinds are currently being, or are likely to be, developed. Therefore, in order to fabricate conductor 10, and to ensure it has the desired conductivity, sorting of commercially available nano-scale material elements 14 is performed as part of the fabrication process. Additionally, uniform dispersion and alignment of the nano-scale material elements 14 received from the sorting process is necessary within conductor 10 in order to get the desired higher conductivity.

In one embodiment, application of an electric field is employed to enhance dispersion characteristics and alignment of the nano-scale material elements 14. Repetitive application of the electric field further increases alignment of the nano-scale material elements 14, further increasing conductivity. After these metallic nano-scale material elements 14 are impregnated into a polymer resin, appropriate curing is performed to build the conductor 10. In another embodiment, a step of removing excess and unwanted portions of the polymeric resin 20 is added to the fabrication process to achieve an even higher value of conductivity per weight ratio.

The nano-scale material elements 14 (e.g., carbon nanotube elements) utilized in conductor 10 exhibit something close to superconducting behavior at an individual level. However, their density is extremely low when compared to the conventional metals. When nano-scale material elements 14 are sorted for an appropriate chirality, and these high conductivity nano-scale material elements 14 are grouped together and aligned into a desired direction a high conductivity is provided. As a result, these nano-scale material elements 14 produce a conductor with a high electrical conductivity having a significantly reduced weight, as compared to existing copper and aluminum wire implementations.

Conductor 10 is then fabricated, in one embodiment, by utilizing a polymeric resin 20 is added as binder and structural support eventually to build application specific products. One recent set of test results indicates that the current value of the specific resistivity (resistivity multiplied by density) is reduced by approximately 50% as compared to copper and aluminum conductors. For a numeric example, a specific resistivity associated with at least one of the herein described embodiments is believed to be about 3.6 g-ohm-cm-2 which represents a significant improvement over the resistivity values associated with copper (15.3) or aluminum (7.2).

Figure 2:
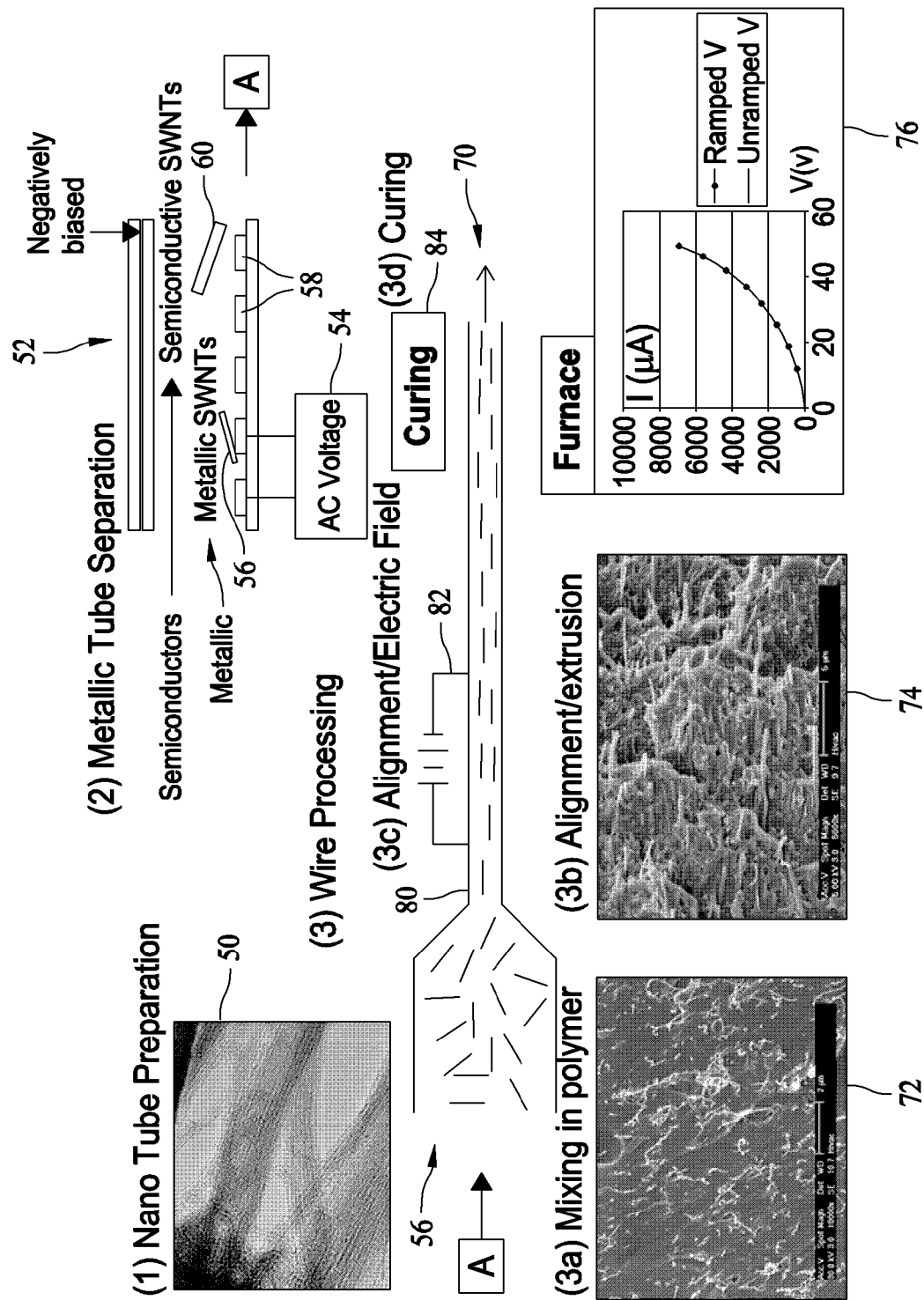
FIG. 2 is diagram illustrating a nano-scale material conductor fabrication process.

FIG. 2 is an illustration of an overall processing flow that might be utilized to fabricate the conductor 10 illustrated in FIG. 1. Referring specifically to FIG. 2, nano-scale material elements are prepared 50 by removing amorphous carbon and metal catalyst residue from the commercially manufactured nano-scale material elements. In one embodiment, the nano-scale material elements utilized are single walled carbon nanotube (SWNT) elements having a high purity. SWNT elements are utilized in the embodiment based on at least one of material availability and maturity, degree of electrical conductivity, processing amenability, cost, and weight reduction potential. Embodiments that include the above described double walled carbon nanotube elements, multiple walled carbon nanotube elements, and many walled carbon nanotube elements, and various combinations thereof are also contemplated.

Figure 3:
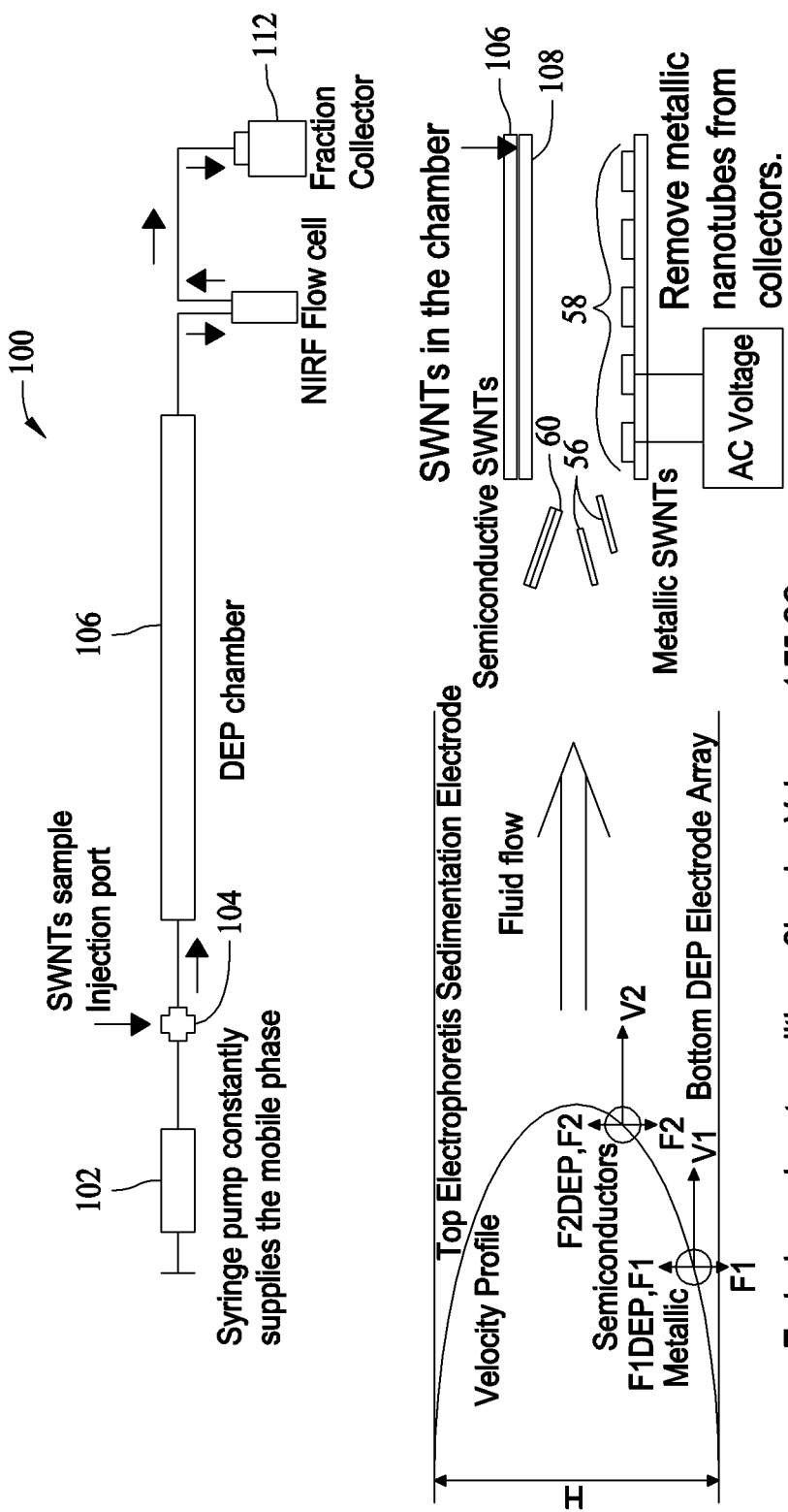
FIG. 3 is a diagram illustrating a process for separating semi-conductive nano-scale material elements from metallic nano-scale material elements.

Dieletrophoresis field flow fractionation is utilized in one embodiment for metallic nanotube separation 52, and is further described with respect to FIG. 3. Commercially available nano-scale material elements 14 are produced in a variety of different conducting levels, including semi-conducting nanotubes, which degrade electrical conductivity if included within conductor 10 (shown in FIG. 1), and metallic nanotubes which are preferred within conductor 10. Separation of the nano-scale material elements 14, based on conductivity, is carried out by applying a negatively biased electric field associated with an AC voltage 54. Application of the electric field causes "metallic" nano-scale material elements 56 to be collected at one or more electrodes 58 while "semi-conducting" nano-scale material elements 60 pass through the electric field. All the metallic nano scale material elements 56 captured at the electrodes 58 are collected and moved to the next processing step, which is referred to as wire processing 70.

Wire processing 70 includes three substeps which result in a high electrical conductivity for the conductor 10 while also maintaining a structural integrity for the product. In step 72, sorted, metallic nano-scale material elements 56 are mixed in a polymer of choice (e.g., polymeric resin 20), the metallic nano-scale material elements 56 are then aligned 74, and the resin is cured 76. One portion of the alignment step 74 includes directing the mixture of metallic nano-scale material elements 56 and resin into a smaller channel 80 and an extrusion effect is naturally achieved, which helps with nano-scale material element alignment.

Further alignment and uniform dispersion of nano-scale material elements 14 is achieved by repetitively applying an incrementally increasing electric field 82. At least one set of test results has indicated the effect of further alignment using the described wire processing technique. Removal of excess resin and appropriate furnace curing 84 completes the wire formation, resulting in conductor 10 (shown in FIG. 1). In this embodiment a portion of the polymeric resin is removed just prior to complete polymer curing. Removal of a portion of the polymeric resin decreases the weight of the conductor product even further and is acceptable as long as removal of the resin does not reduce the structural integrity of conductor 10.

FIG. 3 is a flow diagram 100 further illustrating the process for separating semi-conductive nano-scale material elements 60 from metallic nano-scale material elements 56. A fluid flow, sometimes referred to as a mobile phase, is utilized and originates from a syringe pump 102. At an injection port 104, the nano-scale material elements are added to the fluid flow. Within a dieletrophoresis chamber 106 an electric field is applied and the semi-conducting nano-scale material elements 56 are separated from the semi-conductive nano-scale material elements 60 and attach to the electrodes 58. The dieletrophoresis chamber 106 includes the electrodes 58 and a electrophoretic sedimentation electrode 108 opposite electrodes 58 inducing a dieletrophoresis field flow.

A near-infrared fluorescence (NIRF) flow cell 110 is utilized to further separate semi-conducting nano-scale material elements 60 for collection in fraction collector 112. The metallic nano-scale material elements 56, which are of primary interest, are collected on the electrodes 58 of dieletrophoresis chamber 106 as described above.

Figure 4:
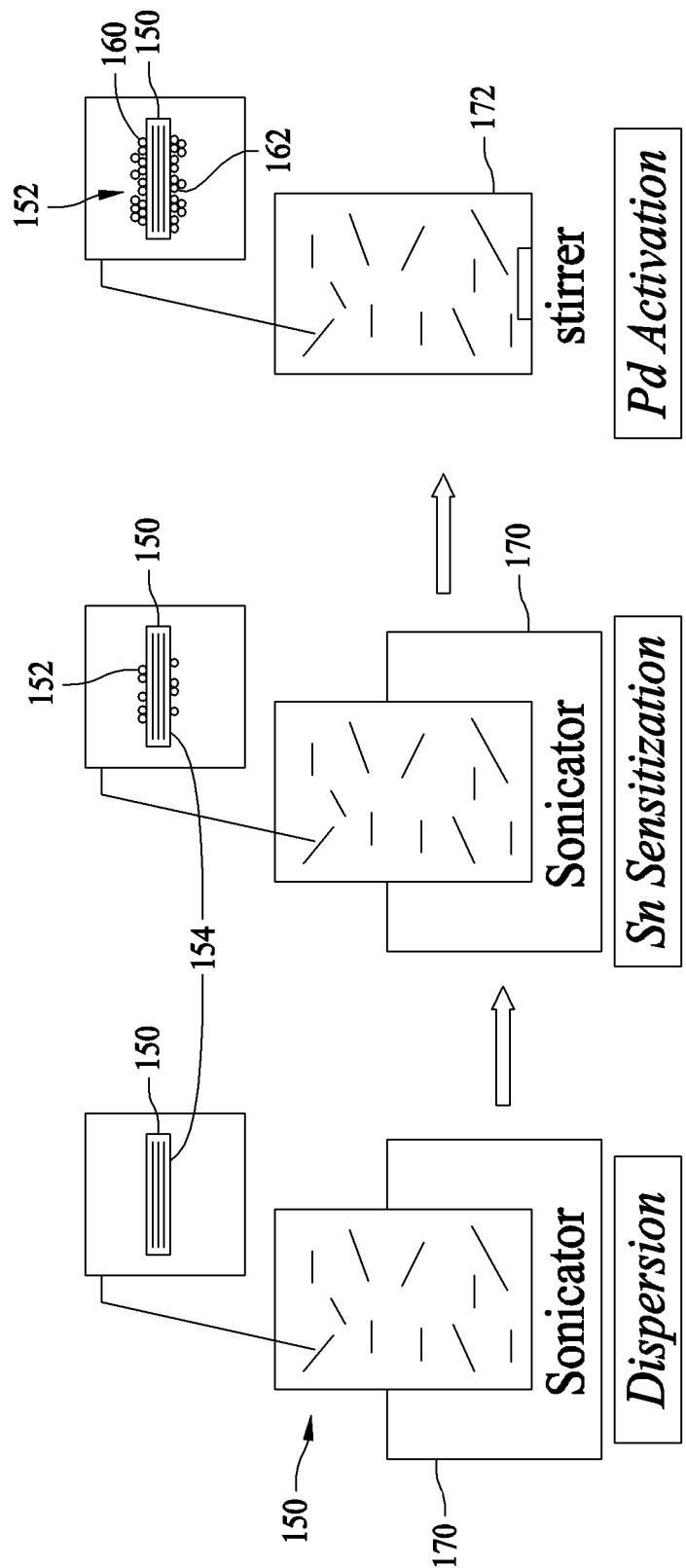
FIG. 4 is an illustration of a process for placing nano metal particulates on a surface of nano-scale material elements.

Further processing of the metallic nano-scale material elements 56, after collection in dieletrophoresis chamber 106, may be incorporated. In an embodiment, illustrated in FIG. 4, further improvement in electrical conductivity of a carbon nano-scale material element 150 can be achieved by incorporating a nano metal film (not shown) or nano metal particulates 152 on the surface 154 of the carbon nanot scale material element 150. Further, by using two different types of nano-scale elements 160 and 162 as particulates 152, high electrical conductivity is ensured since interface related electron transport is enhanced. In the example process flow of FIG. 4, the nano-scale material elements 150 are first dispersed in a solvent within sonicator 170. Additional processing, for example, to add a sensitization to tin (Sn) to the nano-scale material elements 150 is also accomplished within the sonicator 170. Within stirrer 172, a palladium (Pd) activation process is utilized which enhances attachment of nano particles 160 and 162 to the nano-scale material elements 150.

Figure 5:
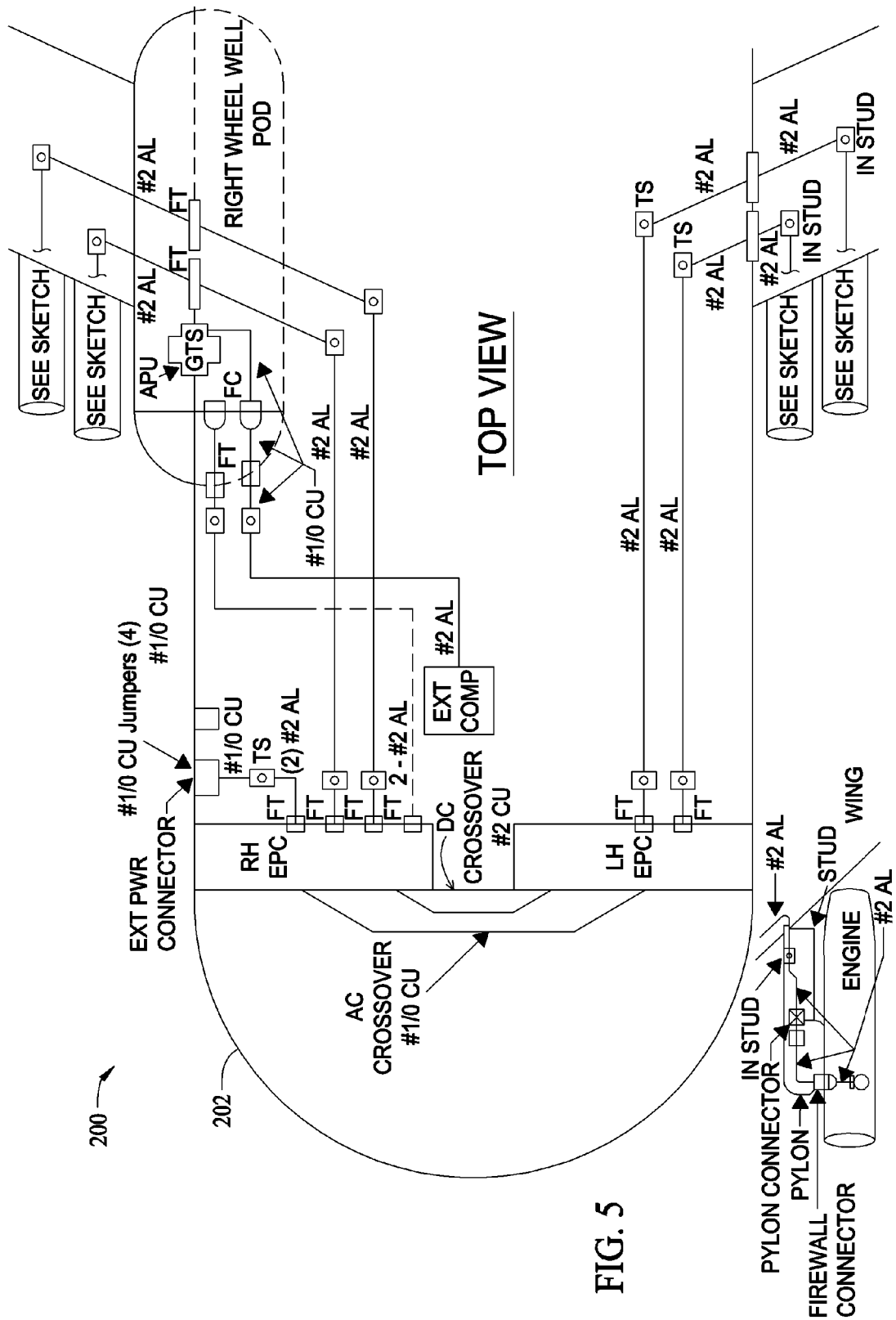
FIG. 5 is a partial power system wiring diagram for an aircraft.

FIG. 5 is a partial power system wiring diagram 200 for a representative aircraft, which illustrates the applicability of the above described embodiments to an aircraft system. Diagram 200 illustrates the preponderance of copper (CU) and aluminum (AL) within an aircraft 202. In the example application of FIG. 5, it is estimated that a reduction in weight of the aircraft system by approximately 1,100 pounds can be achieved, specifically about 600 pounds in power distribution wiring and about 550 pounds in signal distribution wiring. A similar analysis performed for another example commercial aircraft indicated that a reduction of nearly 2,000 pounds in wiring weight is achievable.

The described embodiments are believed to have a large number of potential applications, ranging from basic materials companies to utility companies, construction companies, electronics companies, medical instrument and diagnostic companies, automobile manufacturing companies to name just a few. The weight reductions achieved using the describe embodiments will result in fuel savings and operating cost reductions for a wide range of applications, examples of which include aircraft, spacecraft, and other mobile ground vehicle systems. Additional applications are found in electronic system and hand-held devices where weight is sometimes considered to be of significant importance. In still another example, for spacecraft it costs about $10,000 to launch a pound of payload into low earth orbit. As such, any type of weight reduction translates into significant cost savings.

The above described embodiments rely on nano-scale material elements (e.g., carbon nanotube elements) that are formed into a desired orientation and shape through a binding that includes, for example, a minute polymeric resin. In one specific embodiment, the carbon nano-scale material elements are sorted so that only highly electrically conductive metallic nano-scale material elements will be utilized in the fabrication of the described conductors. Such nano-scale material elements are sometimes described as having a metallic chirality. In the above described embodiment, utilization of such nano-scale material elements result in a conductor which has an improved (lower) specific resistivity (i.e., electrical resistivity multiplied by density).

While the invention has been described in terms of various specific embodiments, those skilled in the art will recognize that the invention can be practiced with modification within the spirit and scope of the claims.

What is claimed is:

1. A method for fabricating a conductor, said method comprising:
    separating, using a first electric field, a plurality of nano-scale material elements into metallic nano-scale elements and semi-conducting nano-scale elements;
    dispersing the metallic nano-scale material elements within a resin to provide a resin-nano-scale material mixture;
    extruding the resin-nano-scale material mixture into a channel such that the metallic nano-scale material elements are naturally aligned in a first direction;
    applying a second electric field to the resin-nano-scale material mixture to further align the metallic nano-scale material elements in the first direction within the resin-nano-scale material mixture, wherein the second electric field is applied to a portion of the resin-nano-scale material mixture while the portion is being extruded; and
    curing the resin-nano-scale material mixture.

2. A method according to claim 1, wherein application of a second electric field to the resin-nano-scale-material mixture comprises repetitively applying an incrementally increasing electric field to the resin-nano-scale material mixture.

3. A method according to claim 1, further comprising removing a portion of the resin before curing to improve conductivity-to-weight ratio for the conductor.

4. A method according to claim 1, further comprising removing amorphous carbon and metal catalyst residue from the nano-scale material elements.

5. A method according to claim 1, wherein separating a plurality of nano-scale material elements further comprises providing at least one of single walled, double walled, multiple walled, and many walled nano-scale material elements.

6. A method according to claim 1, wherein separating, using a first electric field, a plurality of nano-scale material elements further comprises:
    applying a negatively biased electric field associated with an AC voltage to separate the nano-scale material elements, based on conductivity into metallic nano-scale material elements and semi-conducting nano-scale material elements;
    collecting the metallic nano-scale material elements at one or more electrodes; and
    removing the semi-conducting nano-scale material elements.

7. A method according to claim 1, wherein separating a plurality of nano-scale material elements further comprises incorporating a nano metal film or nano metal particulates on a surface of the nano-scale material elements.

8. A method according to claim 7, wherein incorporating a nano metal film or nano metal particulates further comprises utilizing two different nano-scale elements as particulates to enhance interface-related electron transport.

9. A method according to claim 1, wherein separating a plurality of nano-scale material elements further comprises separating a plurality of carbon nanotube elements.

10. A method for fabricating a conductor, said method comprising:
    separating a plurality of nano-scale material elements into conductive nano-scale elements and semi-conducting nano-scale elements through application of a negatively biased first electric field;
    collecting the conductive nano-scale material elements at one or more electrodes;

dispersing the conductive nano-scale material elements within a resin to provide a resin-nano-scale material mixture; and physically aligning the conductive nano-scale material elements within the resin-nano-scale material mixture through extrusion and application of a second electric field, wherein the second electric field is applied to a portion of the resin-nano-scale material mixture while the portion is being extruded.

11. The method according to claim 10, wherein physically aligning the conductive nano-scale material elements within the resin-nano-scale material mixture comprises:

extruding the resin-nano-scale material mixture into a channel such that the conductive nano-scale material elements are naturally aligned in a first direction;

applying the second electric field to the resin-nano-scale material mixture to further align the conductive nano-scale material elements in the first direction within the resin-nano-scale material mixture.

* * * * *